United States Patent
Isenhour et al.

(10) Patent No.: US 9,952,633 B2
(45) Date of Patent: Apr. 24, 2018

(54) OPTICAL CONNECTORS DISPOSED ON HINGE INTERFACE

(71) Applicant: CORNING OPTICAL COMMUNICATIONS LLC, Hickory, NC (US)

(72) Inventors: Micah Colen Isenhour, Lincolnton, NC (US); James Phillip Luther, Hickory, NC (US); Percil Watkins, Conover, NC (US)

(73) Assignee: Corning Optical Communications LLC, Hickory, NC (US)

( * ) Notice: Subject to any disclaimer, the term of this patent is extended or adjusted under 35 U.S.C. 154(b) by 9 days.

(21) Appl. No.: 14/810,643

(22) Filed: Jul. 28, 2015

(65) Prior Publication Data

US 2016/0041348 A1    Feb. 11, 2016

Related U.S. Application Data

(60) Provisional application No. 62/034,975, filed on Aug. 8, 2014.

(51) Int. Cl.

| | |
|---|---|
| *G06F 1/16* | (2006.01) |
| *G02B 6/38* | (2006.01) |
| *E05D 7/12* | (2006.01) |
| *E05D 11/00* | (2006.01) |
| *G02B 6/32* | (2006.01) |
| *G02B 6/42* | (2006.01) |

(52) U.S. Cl.
CPC ............ *G06F 1/1683* (2013.01); *E05D 7/12* (2013.01); *E05D 11/0081* (2013.01); *G02B 6/3829* (2013.01); *G02B 6/3885* (2013.01); *G02B 6/3886* (2013.01); *G06F 1/1654* (2013.01); *E05D 2007/126* (2013.01); *G02B 6/32* (2013.01); *G02B 6/3821* (2013.01); *G02B 6/3893* (2013.01); *G02B 6/4214* (2013.01)

(58) Field of Classification Search
None
See application file for complete search history.

(56) References Cited

U.S. PATENT DOCUMENTS

| | | | | |
|---|---|---|---|---|
| 6,470,132 | B1 * | 10/2002 | Nousiainen .......... | H04B 10/801 385/146 |
| 6,530,784 | B1 * | 3/2003 | Yim ..................... | G06F 1/1616 361/679.29 |
| 7,447,007 | B2 | 11/2008 | Jeun et al. ................... | 361/683 |
| 7,708,240 | B2 | 5/2010 | Homer et al. ............... | 248/130 |
| 8,441,455 | B2 | 5/2013 | Chang .......................... | 345/173 |

FOREIGN PATENT DOCUMENTS

KR    611957 B1    8/2006    ............ G06F 1/16

* cited by examiner

*Primary Examiner* — Jerry Rahll
(74) *Attorney, Agent, or Firm* — Michael E. Carroll, Jr.

(57) ABSTRACT

Disclosed are optical connectors for electronic devices that are disposed at a hinge of the device. The electronic device has an optical connector comprising a base portion having a hinge with a hinge attachment structure and a base connector having one or more base optical channels, and a display. The display comprising a display attachment structure and a display connector having one or more display optical channels for mating with the base connector. The concepts disclosed allow an optical connection for electronic devices having a display that is separable from a base portion.

25 Claims, 5 Drawing Sheets

OPTICAL CONNECTORS DISPOSED ON HINGE INTERFACE

PRIORITY APPLICATION

This application claims the benefit of priority under 35 U.S.C. § 119 of U.S. Provisional Application Ser. No. 62/034,975, filed on Aug. 8, 2014, the content of which is relied upon and incorporated herein by reference in its entirety.

FIELD

The disclosure is directed to complimentary optical connector designs that are disposed on a hinge interface that allow separation of the device into different portions such separating a display from a base portion.

BACKGROUND

Optical fibers have displaced copper-based connectivity in much of the traditional long-haul and metro telecommunication networks for numerous reasons such as large bandwidth capacity, dielectric characteristics and the like. As consumers require more bandwidth for consumer electronic devices such as smart phones, laptops, tablets and the like optical fibers and optical ports for optical signal transmission are being considered for replacing the conventional copper-based connectivity for these applications. However, there are significant challenges for providing optical connectivity in consumer devices compared with copper-based connectivity. By way of example, devices such as smart phones, laptops and tablets are exposed to rough handling and harsh environments and the consumer will expect optical connectivity to handle these demanding conditions.

Further, new device designs are being introduced that present new challenges for connectivity. By way of example, relatively thin devices such as tablets and smart phones may provide significant challenges for providing connectivity due to the thin profile. Further, tablets and smart phone are being incorporated into other devices/footprints such as docking stations, head-units, and the like where the tablet (e.g., display) may be easily and quickly removed from a station such as a charging unit or keyboard by the user and then placed back as desired and require a quick-connect/disconnect with a high-speed data connection between tablet and the keyboard. In other words, the device can separate into two or more portions and may require connectivity between the portions.

These types of devices will require a large number of mating/unmating cycles during their lifetime. Further, as the devices become compact and relatively thin the associated optical connectors should also become compact with a relatively small footprint while still being robust enough for consumer applications. Thus, there is an unresolved need for optical connectors that may be used with consumer or other devices that can accommodate harsh treatment of the consumer environment, new device designs, and a large number of mating/unmating cycles expected during the lifetime of the device, and having a suitably compact footprint.

SUMMARY

The disclosure is directed to optical connectors for use in hinged applications along with other device applications. The concepts disclosed allow an optical connection for electronic devices having a display that is separable from a base portion. In one variation, the disclosure is directed to an electronic device having an optical connector comprising a base portion having a hinge with a hinge attachment structure and a base connector having one or more base optical channels, and a display. The display having a display attachment structure and a display connector having one or more display optical channels for mating with the base connector.

In another embodiment, the disclosure is directed to electronic device having an optical connector comprising a base portion having a hinge with a hinge attachment structure and a base connector having one or more base optical channels along with first alignment pin and a second alignment pin disposed on opposite sides of the one or more base optical channels, and the first and second alignment pins including a magnetic material. The electronic device also includes a display having a display attachment structure and a display connector. The display connector comprises one or more display optical channels for mating with a base connector along with a first bore and a second bore disposed on opposite sides of the one or more display optical channels.

The optical connections disclosed herein may optionally also include an electrical connection if desired.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION

Reference will now be made in detail to the embodiments of the disclosure, examples of which are illustrated in the accompanying drawings. Whenever possible, like reference numbers will be used to refer to like components or parts.

The electronic devices and optical connectors disclosed herein enable high-speed data applications for transmitting optical signals to and from electronic devices. More specifically, the electronic devices disclosed have an optical connector that allows a display to be removably attached to a base portion at a hinge with the optical connection being disposed in a portion of the hinge. The optical connectors at the hinge location may have a relatively small and compact footprint so that they have design that allow rotation of the hinge for moving the display relative to the base portion, but the concepts disclosed may be adapted to other electronic devices, as well as other suitable applications that allow decoupling between a first device and a second device.

The described embodiments have the base portion of the electronic device comprising a hinge with a base connector and a hinge attachment structure for receiving a display, where the base connector comprises an optical body having one or more base optical channels. The display comprises a display connector having one or more display optical channels for mating with the base connector and a display attachment structure. However, in other variations the display could have the hinge on the display portion of the electronic device. The optical body of the connector such as the base connector or the display connector may include a total internal reflection (TIR) surface with a lens at a second side of the optical body for turning the optical signal along with at least one fiber lead-on aligned to the TIR surface. The display connector may comprise a circuit board with active optical components for electrical-to-optical (e-o) conversion or optical-to-electrical (o-e) conversion of signals. The concepts disclosed provide the electronic device to be separable while having a high-speed optical connection with a relatively small footprint at the joining point so that display and base portion of the electronic devices can communicate when connected. The optical connection may also allow part of the device to interface with other devices too.

Figure 1:
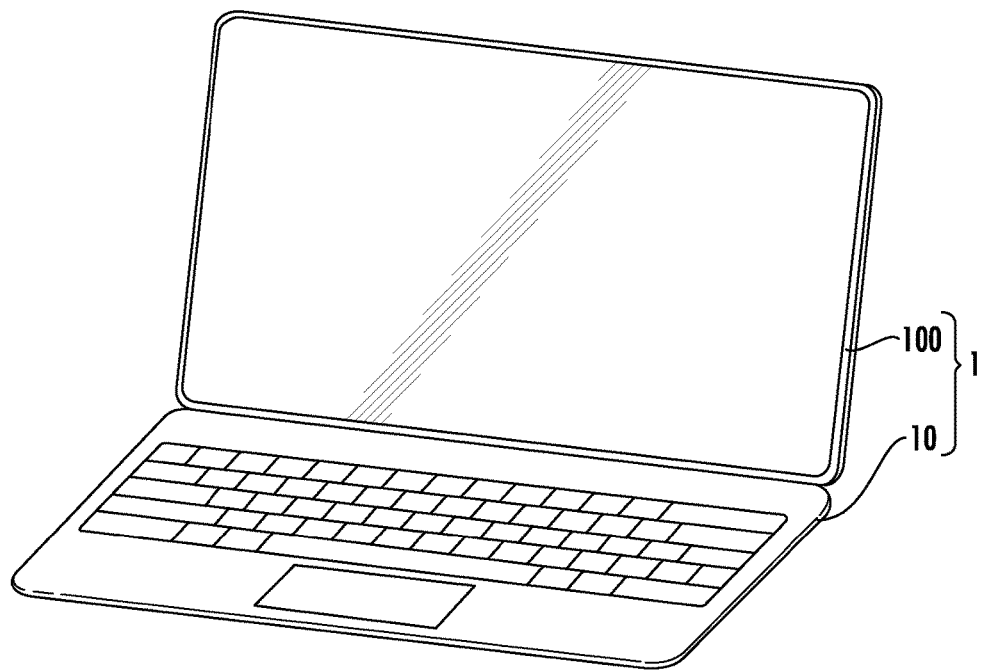
FIG. 1 is a perspective view showing an electronic device that includes a display that is removably mounted to base portion at a hinge location.
Figure 2:
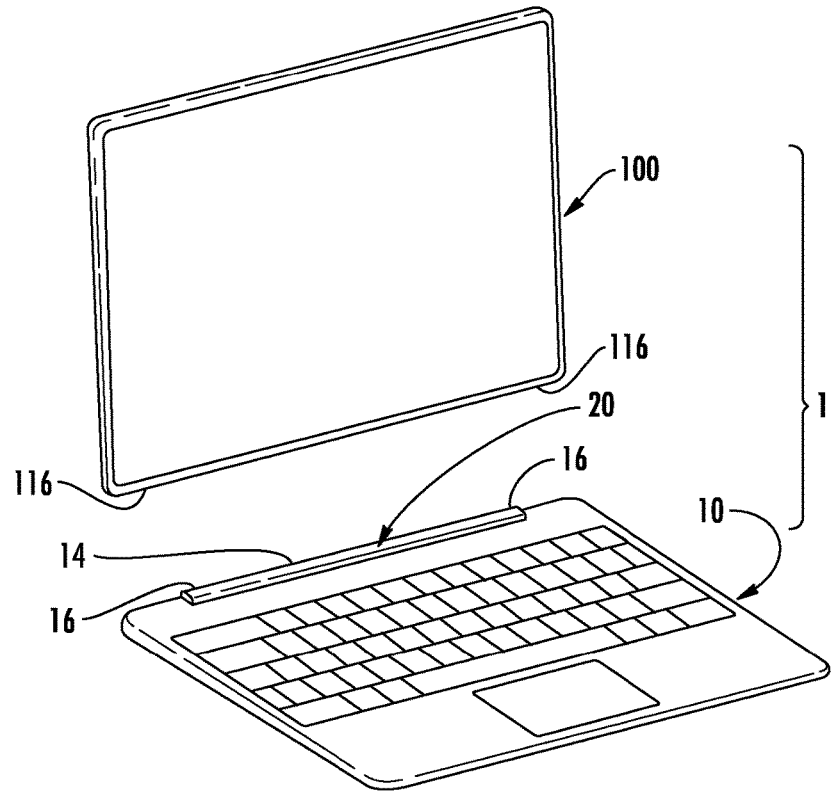
FIG. 2 shows the electronic device of FIG. 1 with the display removed from the hinge of the base portion.

FIG. 1 is a perspective view of an electronic device 1 having a base portion 10 and a display 100 that are in a mated state with an optical connection for signal transmission therebetween. Display 100 is removably attachable to the base portion 10 at the hinge 14 of electronic device 1 as depicted in FIG. 2 showing the base portion 10 and display 100 in an unmated state with a disconnected optical connection. Thus, the display 100 and base portion 10 may be used independently from one another such as a tablet, keyboard, storage, etc. and/or be used with other devices such as the display connecting to another base or docking device. For instance, as shown the base portion 10 includes a keyboard.

Figure 8:
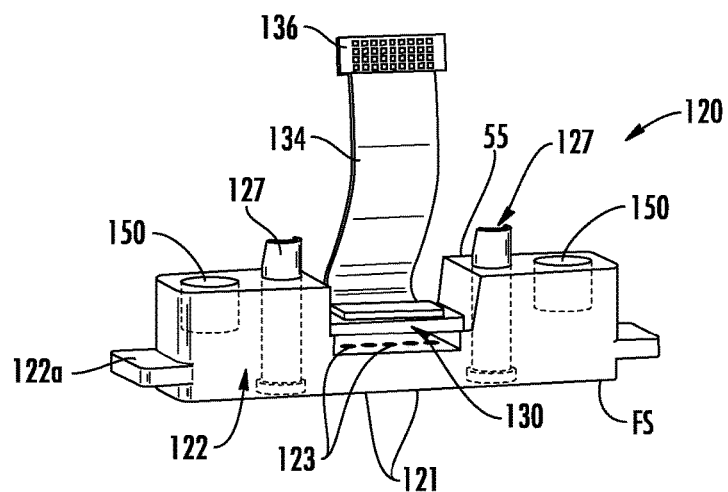
FIG. 8 is a perspective view of a display connector.
Figure 9:
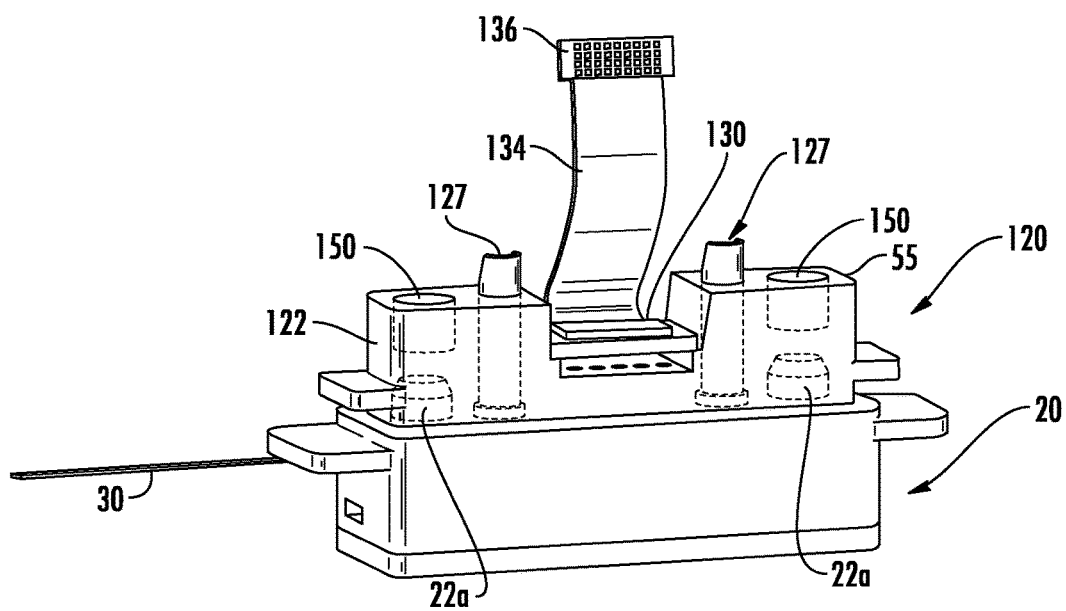
FIG. 9 is a perspective view showing the optical connector of the base portion mated with the display connector with the device removed for clarity.

Base portion 10 comprises a hinge 14 that allows the display 100 to rotate with respect to base portion 10 in one or more suitable directions. Hinge 14 comprises a base connector 20 having one or more base optical channels 21 and a hinge attachment structure 16. Display 100 comprises complimentary display attachment structure 116 that cooperates with hinge attachment structure 16 for securing the devices together in a suitable manner. For instance, hinge attachment structures 16 of hinge 14 are arranged as protrusions and display hinge attachment structure 116 of display 100 are arranged as pockets that receive and has a mechanism for locking to the protrusion. Although, the structure attach in an push and click arrangement with a sliding lever for releasing the display, other attachments such as sliding attachments are possible for attaching the display according to the disclosed concepts. Base connector 20 makes an optical connection with a complimentary display connector of the removable display 100 when properly attached as shown in FIGS. 8 and 9.

Hinge attachment structure 16 is used for mechanically attaching and securing the display 100 to the hinge 14 of the base portion 10 in a suitable manner. As depicted in this embodiment, the hinge attachment structure 16 is disposed on the outboard sides of the base connector 20 and cooperates with hinge attachment structure suitably disposed on display 100. Hinge 14 or display 100 may also include a release such as a latch or slide for locking and unlocking the mechanical attachment of the display 100 to the hinge 14.

In this embodiment, hinge attachment structures 16 are depicted on outboard sides of base connector 20. Locating the hinge attachment structures 16 at outboard locations provides stability in the attachment, but typically limits the display 100 to rotation about a single axis. Further, the attachment of the display 100 to the base portion can use one or more of several different attachment techniques that influence how the base connector is modified. For instance, if the display has a sliding attachment, then the base connector would need to have optical alignment features that do not interfere with the sliding attachment. Other hinges or hinge attachment structures are possible that allow for rotation of the display about more than one axis using the concepts disclosed. Moreover, the base and display connectors may be configured symmetrically so that the optical connection is palindromic and may be attached in more than one orientation if desired.

Figure 3:
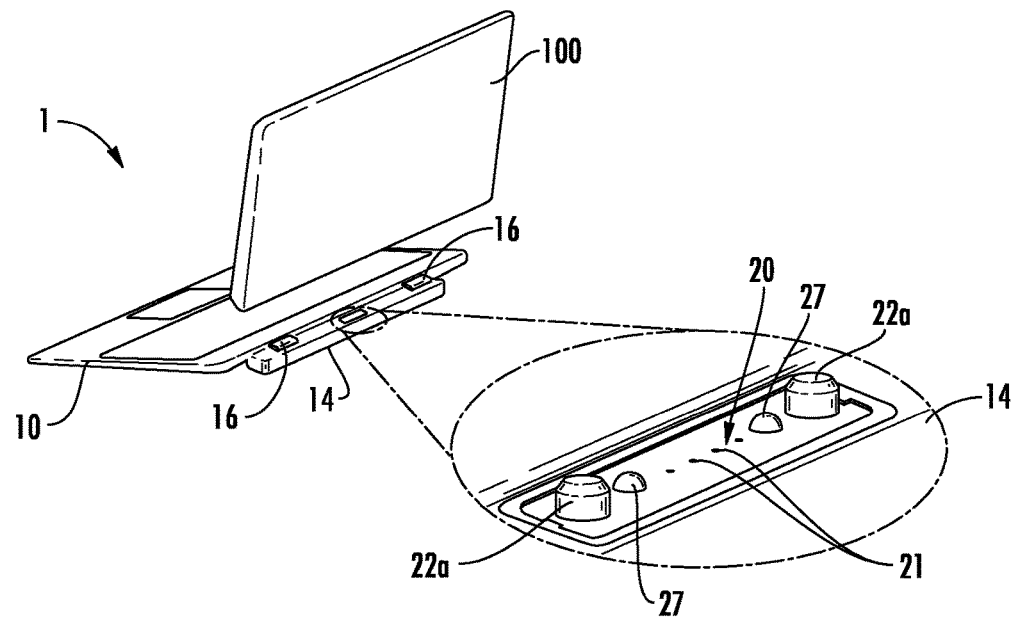
FIG. 3 is another perspective view of the electronic device of FIGS. 1 and 2 showing the display removed from the base portion along with a detail bubble showing the base connector disposed on the hinge.

FIG. 3 depicts electronic device 1 with the display 100 disconnected from the base portion 10 and a detail bubble showing base connector 20. Base connector 20 comprises one or more base optical channels 21 for transmitting/receiving optical signals to/from the display 100 according the concepts disclosed herein. The one or more base optical channels 21 are disposed on an optical body 22. Optical body 22 also includes a first alignment feature 22a and a second alignment feature 22a disposed on opposite sides of the one or more base optical channels of optical body 22. Alignment features 22a may take any suitable form such as alignment pins, alignment bores, alignment faces, etc. In this particular embodiment, alignment features 22a are alignment pins that are integrally formed by optical body 22.

Figure 4:
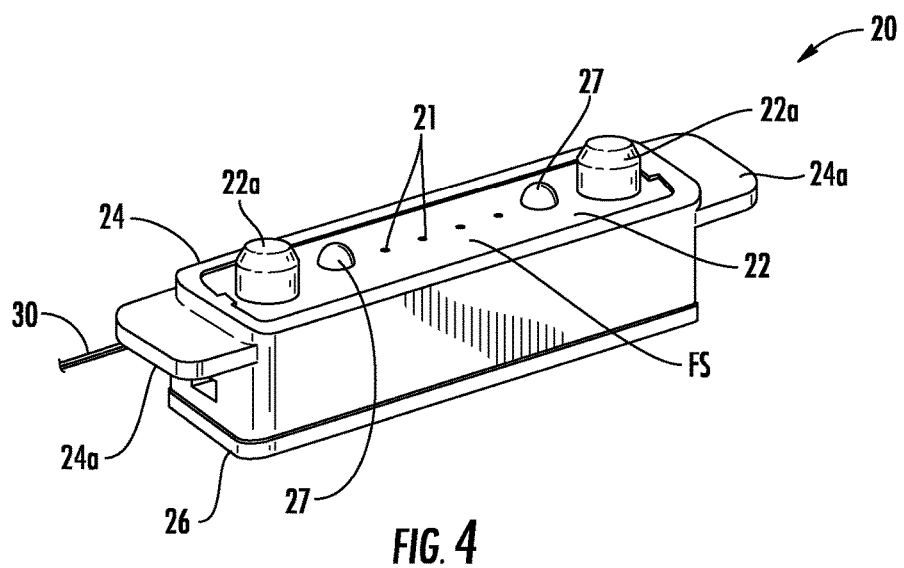
FIG. 4 is a perspective view of the base connector of FIG. 3 removed from the base portion.
Figure 6:
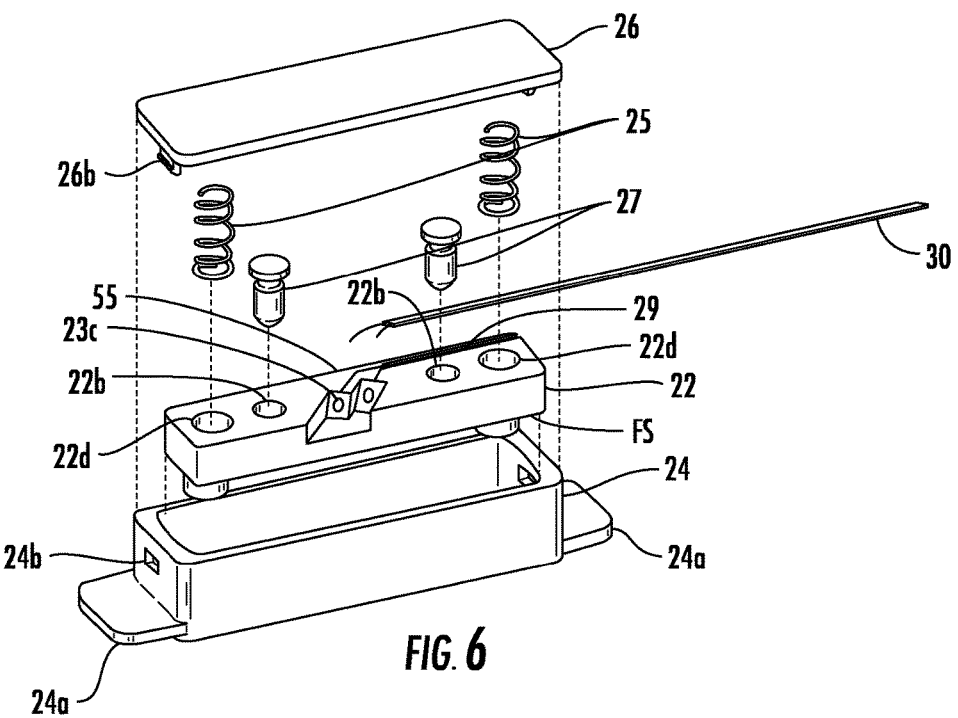
FIG. 6 is another partially exploded view of the optical connector of FIG. 4.

FIG. 4 depicts base connector 20 removed from the base portion 10 and hinge 14. As depicted, base connector 20 includes a housing 24, thereby allowing base connector 20 to have a modular construction that can be incorporated into different devices. As discussed herein, base connector 20 is disclosed as a portion of a hinge, but the concepts may be used with a fixed construction too. Base connector 20 comprises an optical body 22 with one or more base optical channels 21. Optical body 22 fits into housing 24 and may include a stop at the front end of the housing 24 for the optical body 22 as best shown in FIG. 6. Housing 24 may also comprise mounting features 24a such as ears or tabs for securing the base connector 20. Base connector 20 may also include optional features such as optical alignment features, electrical contacts, floating optical body, etc.

Figure 5:
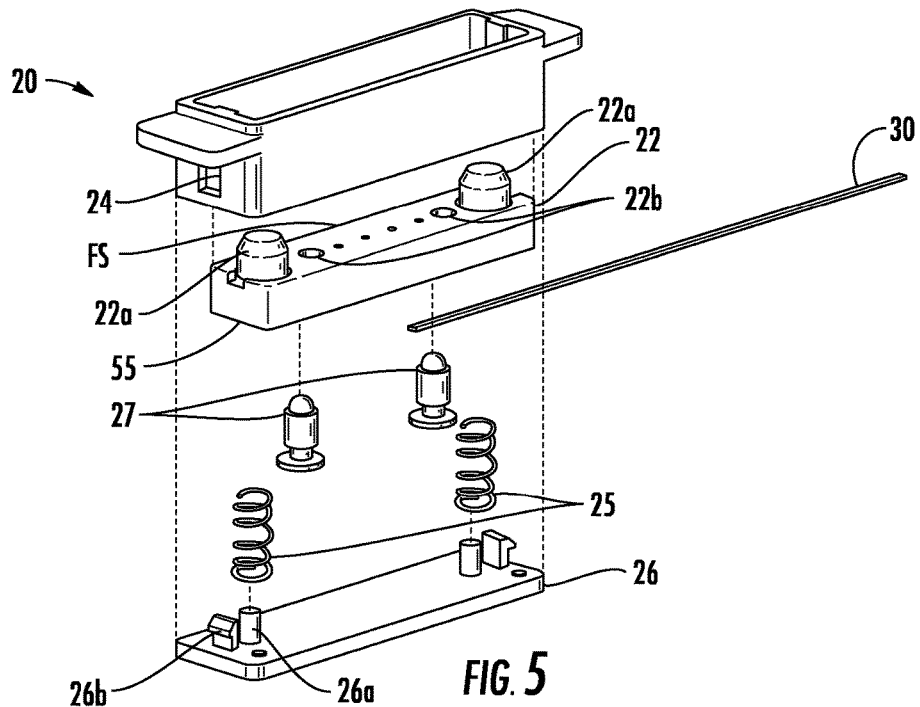
FIG. 5 is a partially exploded view of the optical connector of FIG. 4.
Figure 7:
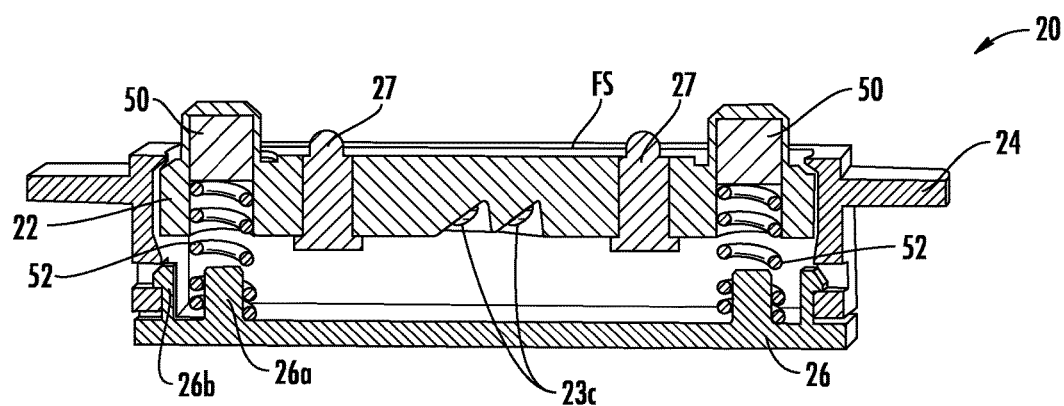
FIG. 7 is a cross-section of the optical connector of FIG. 4.

FIGS. 5-7 depict detailed views of one embodiment of the base connector 20. Base connector 20 includes optical body 20 for interfacing with and making an optical connection with a complimentary display connector 120 such as depicted in FIGS. 8 and 9. Specifically, FIG. 5 is an exploded view of the base connector 20 from a top perspective and FIG. 6 is an exploded view from a bottom perspective. Base connector 20 also comprises a housing 24 with a cover 26 for securing the optical body 22 biased by springs 25. As shown, cover has an inside surface with one or more spring mounts 26a and one or more securing devices 26b such as latches for securing cover 26 to the bottom of housing 24. As depicted, housing 24 has windows (not numbered) for receiving portions of securing devices 26b of cover 26. In other variations, the housing 24 could be attached directly to a base portion without a cover. Optical fibers 30 are routed and secured to the respective base optical channels of optical body 22. Further assembled details are depicted in FIG. 7, which is a cross-section of base connector 20.

Optical body 22 includes at least one optical channel 21 with an optical interface portion (not numbered) at a first side FS. The optical body 22 is formed from a suitable material for transmitting optical signals at the desired wavelength. As an example, the optical body 22 may be formed from LEXAN®, but other suitable materials that can transmit optical signals are possible. When assembled, the at least one optical fiber 30 is in optical communication with the optical channels 21 of optical body 22 of base connector 20 and optical body 22 may be biased by one or more springs 25 (i.e., floats) for easing alignment tolerances between display 100 and base portion 10 for making a suitable optical connection.

Optical body 22 may further include one or more alignment features 22a disposed on the first side FS of the optical body 22. Alignment features 22a cooperate with complimentary features such as bores on the complimentary connector for suitable aligning the optical channels of the respective optical interface portions. In this embodiment, alignment features 22a are alignment pins; however, other suitable alignment features are possible for optical body 22 such as alignment bores or other structure. Base connector 20 and complimentary display connector 120 may solely provide an optical connection or may have a hybrid optical and electrical connection if desired. In this embodiment, base connector 20 includes electrical contacts 27 that are disposed on opposite sides of the optical interface about the optical channels 21.

As depicted, the first side FS is located on an opposite side from second side SS. In this embodiment, optical body 22 has two optical channels 21 that terminate at the first side FS for optical communication with a complimentary optical connection. Typically, the two optical channels are arranged as a transmit-receive pair, but other variations of optical bodies may have any suitable number of respective optical channels such as four, eight or more optical channels. In this configuration, each respective optical channel 21 includes a TIR surface 23c with an optional respective lens (not numbered) for turning the optical signal at the second side SS.

TIR surface 23c operates by using the different indexes of refraction between the material/air interface for turning the optical signal back into the optical body 22 and toward the optical interface where the optical channels 21 termination on the first side FS of optical body 22. Using a TIR surface 23c allows for a relatively small footprint of base connector 20. Moreover, the TIR surfaces 23c are located on angled surfaces disposed on second side SS of optical body 22. By way of example and not limitation, the TIR surfaces 23c are disposed at about a 45 degree angle with respect to the generally planar second side SS of optical body 22, but other angles are possible. This arrangement allows the base connector 20 to advantageously have a relatively small footprint, especially in relatively small height for matching the small heights of thin devices such as tablets, smart phones and the like. By way of example, the base connector 20 may have a height of about 10 millimeters or less and may even be 5 millimeters or less, but other dimensions are possible. The TIR surface 23c are also disposed at about a 45 degree angle with respect to the incoming optical fibers 30 that are routed in a runner 29 on the second side SS. The lens on the TIR surface 23c is used for focusing or collimating the respective optical signals and locating the lens at the TIR surface and also allows for a compact construction for the optical connector.

Base connector 20 may also optionally include one or more electrical contacts 27 if desired. As depicted, optical body 22 includes one or more bores 22b adjacent to the optical channels 21 for receiving one or more electrical contacts 27. The base connector 20 may include any suitable electrical contacts and likewise the display connector has complimentary electrical contacts. In this embodiment, the base connector 20 includes one or more pogo pin electrical contacts 27 in the one or more bores 22b. In this arrangement, the electrical contacts 27 are inserted into the bores 22d from the second side SS and a portion of the electrical contacts 27 extend beyond the first side FS. Electrical contacts 27 may be secured to optical body 20 in any suitable manner such a friction fit, mechanical attachment, an adhesive or held in place by a cover. Additionally, optical body 22 has a runner 29 for routing electrical conductors (not shown) of the cable to the electrical contacts 27.

Optical body 22 may also optionally include one or more openings 22d at the second side SS for receiving one or more magnetic materials 50. The one or more magnetic features are used for aligning and/or securing the base connector 20 to the complimentary display connector 120, but other variations using the concepts disclosed herein may use mechanical structures or other arrangements for securing the base connector to the complimentary display connector. If the magnetic materials 50 are used they may have any suitable location on the optical body 22. Further, the openings 22d may have any suitable location on the optical body 22. As used herein, "magnetic material" means a magnetic material or a ferrous material that is attracted to a magnet material. The magnetic material allows for quick and easy mating of the optical connection along with a robust and compact footprint for applications expecting a large number of mating/unmating cycles. By way of example, the optical body of the optical connector may include a first magnet and the complimentary optical connector may use a second magnet of opposite polarity for making an attachment between the respective optical connectors; alternatively, the first optical connector may use a first magnet and the second optical connector may use a ferrous material for making an attachment between the first and second optical connectors.

As best shown in FIGS. 6 and 7, optical body 22 has openings 22d disposed on opposite sides of the optical channels 21. In this arrangement, the one or more openings 22d are aligned with the one or more alignment features 22a on the first side FS of the optical body 22. In this embodiment, the alignment features 22a are alignment pins as shown and the openings 22d only extend partially into the alignment features 22a so the magnetic materials are not exposed, but rather covered by the alignment pins. Thus, the magnetic materials 50 are not visible at the first side FS; however, other arrangements could have the magnetic materials visible at the first side FS if desired. Thus, the alignment features 22a of this embodiment provide alignment and the magnetic materials 50 provide the retention to the complimentary optical connector. Furthermore, openings 22d are deeper than magnetic materials 50 so that openings 22d may also be used as spring seats for springs 52.

Consequently, optical body 22 may float such as being biased by one or more springs 52 in an upward direction for precise alignment with the optical body of the display connector.

FIG. 6 shows a perspective view of a second side SS of optical body 22 showing optical fibers 30 removed from the respective fiber lead-ins for routing the optical fibers 30 to optical channels 21 of the optical body 20 for optical communication. Optical fibers 30 are routed within runner 29 for inhibiting undesired pinching or bending of the optical fibers 30. Runner 29 extends from an edge of optical body 22 on the second side SS to the respective fiber lead-ins. Optical fibers 30 may be secured in place using an adhesive or the like.

Base connector 20 cooperates with a complimentary display connector disposed on the display 100 (or removable portion) of the electronic device 1. FIG. 8 is a perspective view of a display connector 120 removed from display 100 for clarity. Although described in cooperation the concepts of the base connector and the display connector may be used independently or in other configurations. Display connector 120 has a front or first side FS and a second side SS with one or more display optical channels 121 terminating on the first side FS. Typically, display connector 120 is flush mounted to display 100 for an aesthetic design of the same.

Display connector 120 comprises an optical body 122 having a circuit board 130 with active optical components (not numbered) such as VCSEL, photodiodes, and the like that are aligned with the one or more display optical channels 121. Circuit board 130 may also include other electronics such as laser drivers, trans-impedance amplifiers and the like. Display connector 120 has structure for cooperating with the base connector 20 and providing an optical connection. For instance, optical body 122 has alignment features configured as bores for receiving the alignment pins of optical body 22 for aligning respective optical channels for suitable optical communication. Consequently, optical signals may be transmitted/received between the optical channels of the base connector 20 and display connector 120.

Optical body 122 also includes respective lenses 123 on a rear or second side SS for focusing or collimating optical signals for the active components on circuit board 130. Circuit board 130 may be attached in a suitable manner such as gross alignment guides and using passive and/or active alignment before attaching with an adhesive. Circuit board may also optionally include and electrical tether 134 and with an electrical connector 136 on the end.

When mated, the first side FS of display connector 120 cooperates with the first side FS of base connector 20. FIG. 9 is a perspective view showing the base connector 20 removed from the base portion 10 that is mated with the display connector 120 that is removed from the display 100 of the electronic device for clarity. In other embodiments, one or more of the base or display connectors may include a cover for protecting the optical interface from damage or wear.

As depicted, display connector 120 includes magnetic materials 150 for cooperating with magnetic materials 50 of base connector 20. Optical body 122 may also optionally include one or more openings (not numbered) at the second side SS for receiving one or more magnetic materials 150. The one or more magnetic features are used for securing the base connector 20 to the complimentary display connector 120. In this embodiment, magnetic materials 150 are disposed in the alignment bore so that magnetic materials 150 cooperate with the magnetic materials 50 disposes within the alignment pins of base connector 20. Other variations using the concepts disclosed herein may use mechanical structures or other arrangements for securing the base connector to the complimentary display connector.

Although the disclosure has been illustrated and described herein with reference to embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. An electronic device having an optical connector, comprising:
    a base portion having a hinge, the hinge including a hinge attachment structure and a base connector comprising an optical body having one or more base optical channels and a total internal reflection surface for turning an optical signal, wherein the optical body of the base connector is biased by one or more springs; and
    a display having a display attachment structure and a display connector having one or more display optical channels for mating with the base connector.

2. The electronic device of claim 1, wherein the base connector has the one or more base optical channels disposed on the optical body.

3. The electronic device of claim 1, the base connector further including a first alignment feature and a second alignment feature disposed on opposite sides of the one or more base optical channels of the optical body.

4. The electronic device of claim 3, wherein the first and second alignment features are alignment pins that include a magnetic material.

5. The electronic device of claim 1, the display connector further including a first alignment feature and a second alignment feature disposed on opposite sides of the one or more display optical channels.

6. The electronic device of claim 5, wherein the first and second alignment features are bores.

7. The electronic device of claim 1, the hinge attachment structure further including one or more protrusions for engaging the display attachment structure.

8. The electronic device of claim 7, the hinge attachment structure having a first protrusion and a second protrusion disposed on opposite sides of the first connector.

9. The electronic device of claim 1, the base connector further including one or more one or more base electrical contacts and the display connector further including one or more one or more display electrical contacts.

10. The electronic device of claim 9, the base electrical contacts being one or more pogo pin electrical contacts and the display electrical contacts being contact pads.

11. The electronic device of claim 1, the base portion further including a keyboard.

12. An electronic device having an optical connector, comprising:
    a base portion having a hinge, the hinge including a hinge attachment structure and a base connector comprising an optical body having a total internal reflection surface for turning an optical signal and one or more base optical channels along with a first alignment pin and a second alignment pin disposed on opposite sides of the one or more base optical channels, and the first and second alignment pins including a magnetic material; and a display having a display attachment structure and a display connector having one or more display optical channels for mating with the base connector along with a first bore and a second bore disposed on opposite sides of the one or more display optical channels.

13. The electronic device of claim 12, wherein the one or more base optical channels are disposed on an optical body.

14. The electronic device of claim 13, wherein an optical body of the base connector is biased by springs.

15. The electronic device of claim 12, the hinge attachment structure further including one or more protrusions for engaging the display attachment structure.

16. The electronic device of claim 15, the hinge attachment structure having a first protrusion and a second protrusion disposed on opposite sides of the base connector.

17. The electronic device of claim 12, the base connector further including one or more one or more base electrical contacts and the display connector further including one or more one or more display electrical contacts.

18. The electronic device of claim 17, the base electrical contacts being one or more pogo pin electrical contacts and the display electrical contacts being contact pads.

19. The electronic device of claim 12, the base portion further including a keyboard.

20. The electronic device of claim 1, wherein the TIR surface has a lens and the optical body comprises at least one fiber lead-in aligned to the TIR surface.

21. The electronic device of claim 20, wherein the optical body comprises a runner for receiving one or more optical fibers.

22. The electronic device of claim 21, wherein the TIR surface is at a 45 degree angle with respect to the runner.

23. The electronic device of claim 12, wherein the TIR surface has a lens and the optical body comprises at least one fiber lead-in aligned to the TIR surface.

24. The electronic device of claim 23, wherein the optical body comprises a runner for receiving one or more optical fibers.

25. The electronic device of claim 24, wherein the TIR surface is at a 45 degree angle with respect to the runner.

* * * * *

UNITED STATES PATENT AND TRADEMARK OFFICE
CERTIFICATE OF CORRECTION

PATENT NO. : 9,952,633 B2  
APPLICATION NO. : 14/810643  
DATED : April 24, 2018  
INVENTOR(S) : Micah Colen Isenhour et al.

Page 1 of 1

It is certified that error appears in the above-identified patent and that said Letters Patent is hereby corrected as shown below:

In the Claims

In Column 8, Line 54, Claim 9, after "including" delete "one or more".

In Column 8, Lines 55-56, Claim 9, after "including" delete "one or more".

In Column 9, Line 21, Claim 17, after "including" delete "one or more".

In Column 9, Lines 22-23, Claim 17, after "including" delete "one or more".

Signed and Sealed this  
Seventh Day of April, 2020

Andrei Iancu  
*Director of the United States Patent and Trademark Office*